March 25, 1969  L. W. ALVAREZ  3,434,771
GYROSCOPIC LENS
Filed May 11, 1966

INVENTOR.
LUIS W. ALVAREZ
BY
Lippincott, Ralls & Hendrickson
ATTORNEYS

# United States Patent Office 3,434,771
Patented Mar. 25, 1969

3,434,771
GYROSCOPIC LENS
Luis W. Alvarez, Berkeley, Calif., assignor, by mesne assignments, to Bell & Howell Company, Chicago, Ill., a corporation of Illinois
Filed May 11, 1966, Ser. No. 549,360
Int. Cl. G02b 23/02
U.S. Cl. 350—16                                    17 Claims

ABSTRACT OF THE DISCLOSURE

This invention comprises at least one pair of mating spherical lenses, with one lens being buoyantly supported out of contact with the other and free to pivot about a common center of curvature of adjacent lens surfaces. Means are provided for rotating one lens relative to the other about the optic axis of the pair at a substantially constant rate to establish a gyroscopic action. Provision is made for precessing one lens in the same direction of motion as the other lens for traverse of the latter beyond a predetermined minimum. Physical properties of the buoyantly supported lens are particularly limited, as defined below, to preclude nutation.

---

This invention relates to gyroscopes in general, and is more particularly directed to a gyroscopic lens in which one lens element rotates at a constant high speed as a gyro rotor and precesses in the same direction of motion as another lens element.

The present invention is particularly advantageous in precluding the necessity of a plurality of independent sets of bearings in a gyroscope structure. In addition, the invention is advantageous in establishing highly desirable precessing motions.

In various applications it is desirable that a stable gyroscope be provided which is capable of precession without nutation. One particularly important application for such a gyroscope is in stabilized optics, as disclosed in my co-pending application Ser. No. 308,486, now issued as U.S. Patent No. 3,378,326. Briefly, a lens system is provided including mating positive and negative lenses which are relatively moveable about the common center of their interfaces relative to each other. One lens is fixed to the case of an optical instrument, while a gyro is associated with the second lens to maintain it in alignment with the line of sight axis irrespective of small movements of the case and first lens therefrom. By prism action, the mutually displaced lenses stabilize the image at the focal plane of the instrument, despite the movements of the case. In order that the lens system will follow the field of view during traverse or panning by the instrument, provision is made to precess the gyro in the direction of movement when a predetermined range of small movements is exceeded. It has been difficult to effect this precession stably, i.e., without nutation.

It is therefore an object of the present invention to provide a gyro capable of precession without nutation.

Another object of the invention is to provide a simple compact gyro having but one bearing as opposed to the three sets of bearings or gimbals employed in conventional gyros.

Still another object of the invention is the provision of a stabilized lens system in which the gyro is integrally incorporated with the lenses.

It is yet another object of the invention to provide a gyroscopic lens in which one lens element is supported in a fluid medium within another lens element, and the innner lens element is rotated to provide a gyroscopic action.

A further object of the invention is the provision of a gyroscopic lens of the class described, wherein compensation, i.e., deflection of parallel light rays by prism action to provide a stable image, may be partially accompished at one end of the lens and completed at the opposite end of the lens.

It is still a further object of the invention to provide a gyroscopic lens of the character outlined above, wherein the liquid employed as the flotation medium may also be utilized to establish liquid prisms in the lens system.

Additional objects and advantages of the invention will become apparent upon consideration of the following description thereof in conjunction with the accompanying drawings, wherein.

Figure 1:
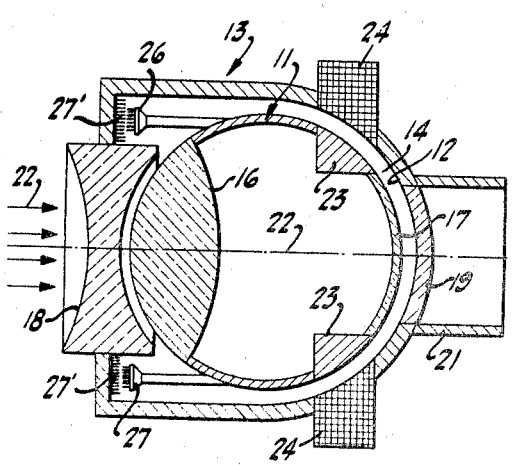
FIGURE 1 is a sectional view taken at a diametric plane through a gyroscopic lens in accordance with the invention.

Considering now the invention in some detail and referring to the illustrated forms thereof in the drawings, there will be seen to be provided a gyroscopic lens which basicallly includes first and second optical elements, one element being supported in a fluid medium contained within the other. The fluid serves as a support medium and to establish a fluid bearing between the respective elements permissive to three-dimensional relative movement therebetween. The optical elements have curved closely-mating surfaces including aligned complementary spherical lens surface which act as a prism when one lens surface is moved relative to the other. Provision is made to secure one of the optical elements in fixed relation to the case of an optical instrument with the lens surface in alignment with the optical axis of the instrument. In addition, means are provided to rotate the other optical element about the axis of the lens surface thereof, i.e., the optical axis of the instrument, at a constant velocity. All closely-mating, arcuate surfaces, such as bearing surfaces and lens surfaces, are centered on the axis of rotation. The rotating optical element, sometimes herein termed an "eyeball," thus functions as a gyro which maintains the lens surface of this element in alignment with the optical axis of the instrument, despite movements of the case thereof. By prism action, the mating lens surfaces of the respective elements thereby compensate for deflections of incident light rays arising from movements of the case and provide a stabilized image in the manner disclosed in the previously mentioned U.S. Patent No. 3,378,326.

The arrangement outlined above may be made to function as an extremely stable gyro capable of precession without nutation. Preferably, the weight of the rotating element is selected to be substantially equal to the mass of the fluid displaced. It is also possible to employ a gas as the fluid. The center of buoyancy of the rotating element is positioned at the center of rotation, and the moment of inertia of the element about the rotational axis is made greater than the moments about the transverse axes. This selection of moments of inertia prevents nutation from being established when precession is initiated by frictional or viscous forces. Thus, stable precession of the rotating element may be effected by means of a simple frictional or viscous precessor to permit effectively locking the lens elements together under predetermined conditions, as for example, in traverse of the field of view of an optical instrument. The use of liquid as the flotation medium permits substantial latitude of design by virtue of the varied density liquids that are available. Moreover, the optical properties of the liquid may be incorporated in the optical design of the system, as will become apparent hereinafter.

Referring to FIGURE 1 in detail, an embodiment of the gyroscopic lens is illustrated wherein the optical elements are spherical. More particularly, a spherical element 11 is disposed within a substantially spherical chamber 12 defined within a generally cylindrical case 13 and containing a flotation liquid 14. The inner element 11 is preferably hollow and provided at one end with a lens 16, which is double convex in the illustrated embodiment. In this regard, a peripheral surface portion of the element 11 defines the outer surface of the lens 16. The opposite end of the element is transparent, as indicated at 17, and preferably formed of glass. An unobstructed optical path is thus provided through the element 11 coaxially of the lens 16, and it will be seen that the inner element has an exterior that is a surface of revolution.

The case 13 is provided with a double concave lens 18 in aligned adjacent relation to the lens 16. The interior surface of the lens 18 forms a portion of the wall of chamber 12, in complementary mating relation to the lens 16. The combination of double convex and double concave lenses is capable of providing complete compensation of deflected light rays by prism action when one lens is moved relative to the other either by translation or rotation. The opposite end of the case from lens 18 is transparent, as indicated at 19, and preferably formed of glass, so as to provide an unobstructed optical path through the case coaxially of the lenses 16 and 18, and the path through element 11. A cylindrical cap 21 projecting coaxially from the transparent wall portion 19 of the case is adapted to fit over the lens mount of a camera, binoculars, or other optical instrument (not shown).

Means are provided to rotate the inner element 11 at a constant high speed about the axis of lens 16, i.e., about the optical axis 22 of the system. The motive rotating means may be variously provided, e.g., rotor slugs 23 of conducting or magnetic material such as iron or the like, may be embedded in the periphery of element 11 and stator windings 24 mounted on the periphery of the case 13. Upon energization of the windings 24 to establish a traveling or rotating magnetic field, the slugs 23 are acted upon to rotate the inner element 11 in a well known manner. Alternatively, driving of the element 11 may be effected by hydraulic energy transfer or viscous drag rather than by motor forces. A motor driven pump coupled to needle jets may be employed to inject high velocity liquid against flaps on the periphery of the element 11 to effect the rotation. Irrespective of the particular motive means employed, the design characteristics noted hereinbefore are incorporated in the gyroscopic lens. More particularly, the axis of maximum moment of inertia of element 11 through the center thereof coincides with the optical axis 22 of the lens system. The center of gravity of element 11 coincides with the center of buoyancy thereof, and the density of the element is substantially equal to the density of the flotation liquid 14, i.e., the mass of the element is equal to the mass of liquid displaced.

With the lens provided as just described, the rotating mass of spherical element 11 functions as a very stable gyro rotor which maintains lens 16 in alignment with the optical axis 22 despite movements of the case 13 therefrom. The element may be precessed frictionally or by viscous drag without nutation, in the direction of intended, relatively large order, movement of the case. In this regard, the case may be formed with an annular chamber 26 concentrically about lens 18 and in tangential communication with spherical chamber 12. Precession may be accomplished by brushes 27 extending radially outward from the element 11 and longitudinally into the chamber 26. As the brushes rotate in the chamber 26, they contact pins 27' when the case 13 is moved more than a small predetermined amount out of alignment with the optical axis 22. This arrangement operates like the invention of my above-noted application to establish forces at right angles to the rotational axis of the element 11, and to the direction of movement of the case. Consequently, the forces cause the element 11 to precess in the direction of movement of the case. Because of the maximum moment of inertia of the element 11 being about its rotational axis, the precession proceeds without nutations.

Figure 2:
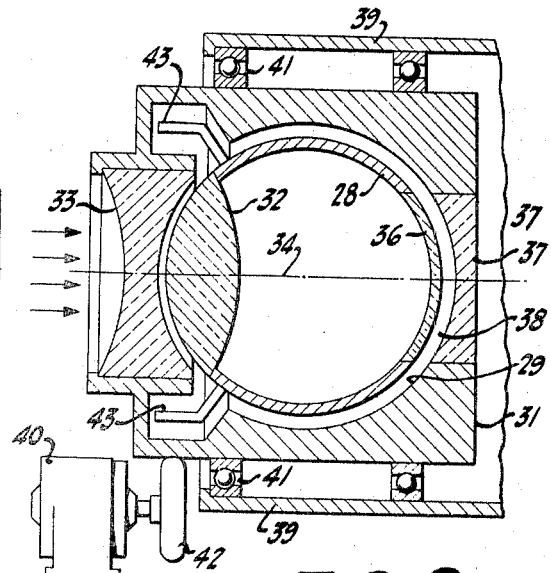
FIGURE 2 is a view similar to FIGURE 1, but partially in schematic, of a modified form of the lens.

There have been described above various methods of rotating the inner element of the present invention, and it is further noted in this respect that certain drive problems as well as other problems may be overcome by rotating the outer element. The desired gyroscopic effect may be attained by rotating the outer element so as to viscously impart rotation to the inner element. An example of this type of structure of the present invention is illustrated in FIGURE 2, and referring thereto, there will be seen to be shown a spherical inner element 28 disposed within a spherical cavity 29 of an outer element 31. The inner element 28 includes a double convex lens 32 mating with a double concave lens 33 in the outer element or case 31. The optical axis 34 of this embodiment extends through the center of the elements and the compensating lenses 32 and 33, in the manner described above. At the opposite end of the unit from the compensating lenses, there are provided transparent portions 36 and 37 in the inner and outer elements, respectively, so that light may pass axially through the unit. Also in common with the above-described embodiment of the present invention, the inner element is supported by a flotation liquid 38 disposed within the cavity 29 about the inner element, and here also, the weight of the inner element is substantially equal to the weight of displaced fluid. Above-described limitations upon the moments of inertia also apply in this instance.

The outer element or case 31 is mounted in a housing 39 by bearings 41, so as to be freely rotatable about the optical axis 34. External drive means are employed to rotate this outer element, and same are illustrated as comprising a friction wheel 42 engaging the periphery of the outer element 31 and driven by a motor 40. The inner element or ball of the unit may be precessed as desired by viscous or frictional forces such as would act upon vanes 43 shown to extend from this inner element 28. Angular displacement of the housing and outer element carried thereby will be seen to cause the vanes 43 to move toward walls of the outer element so as to increase the viscous drag thereon and consequently to apply a tangential force that serves to erect the gyro. This has been found to produce a very smooth intentional movement of the inner element so as to readily accommodate panning or intentional motion of the optical system, while yet maintaining desired compensation for small angle deviations from an original line of sight.

Operation of the embodiment of FIGURE 2 is substantially the same as that described in connection with FIGURE 1 above. Only a very short period of time, i.e., a few seconds, is required to bring the inner ball or element 28 up to the desired rotational velocity with rotation of the outer element 31. Following this attainment of desired rotational velocity, utilization and operation of the device is the same as previously described. It is of interest to note that various flotation liquids may be employed in all embodiments of the present invention. One highly satisfactory flotation liquid is xylene, which is a hydrocarbon coal-tar derivative having a specific gravity of about 0.8, an index of refraction of 1.5, and a viscosity of 0.6 centipoise. It is also noted that while the weight of the central sphere or element of the present invention is herein stated to be substantially equal to the weight of displaced flotation fluid, it is intended by this limitation to insure that the weight of the inner element does not exceed the weight of the displaced fluid. In actual practice, it is advantageous to make the weight of the inner element slightly less than the weight of the displaced fluid, in order to insure that the central element does not under any circumstances move outwardly into contact with the outer element, even at relatively low rotational velocities. Consequently, the term "substantially equal" is herein taken to denote this limitation.

The embodiment of FIGURE 2 described above employs relatively large diameter bearings, and thereby retains a very substantial optical path through the unit, and this is important for applications wherein zoom lenses or the like may be employed with the present invention. On the other hand, in certain applications of the present invention which do not contemplate magnification variations, it is possible to use minute bearings disposed on the optical axis of the unit. Although such small bearings obscure the center of the objective lens of an optical instrument employed with the present invention, certain instruments such as telescopes and binoculars which do not have any magnification variation will not experience any visible obstruction.

In the embodiments of the gyroscopic lens so far described, all of the compensation of deflected light rays has been accomplished at one end of the system by means of a set of double concave and double convex lenses, e.g., lenses 18 and 16 of FIGURE 1. Double concave and double convex lenses are required to provide all of the required compensation by a single set of lenses. In this regard, compensation is herein defined as the deflection of parallel rays from the image by pure (nondispersive) prism action and is measured in percent of the angle between the gyro element and the case or body of the instrument. In a camera, 100% compensation is required, but for telescopes, or equivalent instruments, the compensation desired is given by $$100\left(1 \pm \frac{1}{M}\right)\%$$

where M is the linear magnification and the minus sign corresponds to an erecting telescope, and the positive sign to an inverting telescope. Although a set of double concave and double convex lenses can be designed to provide the required compensation under any of the foregoing circumstances, these sets of lenses produce dispersive effects that give rise to chromatic aberration. Accordingly, in some instances it is desirable to over-compensate with a set of double concave and double convex lenses at one end of the gyroscopic lens systems, and to add a negative compensation at the opposite end of the system to cancel the amount of over-compensation and at the same time cancel the dispersion. For example, a positive compensation of 167% may be employed at one end of the system in conjunction with a negative compensation of 67% at the other end of the system having two and one-half times the dispersion of the lenses at the first end of the system. A net compensation of 100% with a dispersion of zero is thus obtained and the overall system is achromatized. As for example, a set of plano-concave and plano-convex lenses can be provided at one end of the system to provide a positive compensation somewhat less than that required. Additional positive compensation can be provided at the opposite end of the system to make up the difference with zero net dispersion.

Further with regard to compensation, as defined above, it is noted that there are at least four distinct ways of producing such compensation, and in each way it is possible to obtain either plus or minus compensation. It is possible to produce compensation by an equivalent prism formed by motion of the case relative to the internal element. This equivalent prism may be located either forward or behind the center of the eyeball or central element, and can be produced in either the glass or in the liquid. Actually, if the prism is produced in the liquid, it can be directly on the center of the eyeball or central element.

Compensation "ahead" of center is illustrated in FIGURE 1, wherein the outer surfaces of the lens doublet are shown to be curved rather than flat. As stated, the center of curvature of these outer surfaces is located to the left of the input side of the device, and in this instance a positive compensation results. With these outer surfaces curved in the opposite direction, compensation is positive with the center of curvature to the right of the center of the element 11 and becomes negative as the center of curvature is moved to the left of the center of the element 11. Compensation may also be provided by the lens elements themselves at the right or outlet end of the device, as described below in connection with FIGURE 3. Such compensation may also be positive or negative, as discussed below. With regard to liquid compensation, there will be produced a positive compensation for flat or nearly flat surfaces at the inlet side of the device, or on either side of the center of the eyeball, as long as the prism so formed is disposed between the object and the back spherical edge of the eyeball. On the other hand, a liquid prism formed between the back side of the eyeball element 11 and a surface fixed to the case generally provides negative compensation, at least insofar as simple prisms are concerned. This is also discussed below in connection with FIGURE 4.

Figure 3:
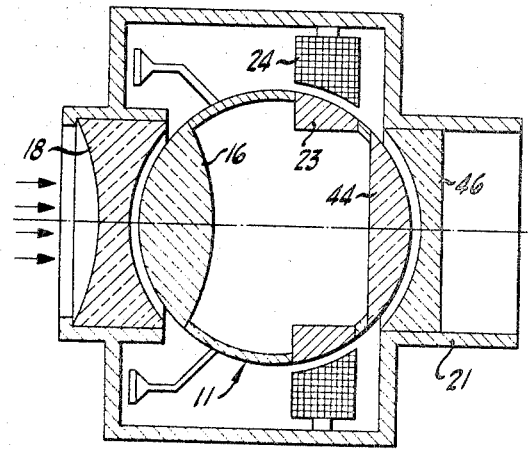
FIGURE 3 is a view similar to FIGURE 1, illustrating a modified form of the lens wherein a combination of positive and negative achromatic compensation is achieved by glass prisms at the opposite ends of the lens system.
Figure 4:
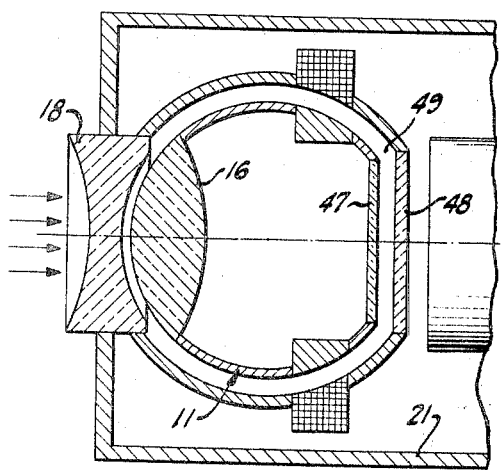
FIGURE 4 illustrates a form of the lens similar to FIGURE 3, but wherein a liquid prism is employed at one end of the system for additional compensation.

One arrangement in which compensation is provided at the opposite or outlet end of the system is illustrated in FIGURE 3. In this figure, the gyroscopic lens of FIGURE 1 is modified to provide compensation at the opposite end of the system from the lenses 16 and 18, otherwise the system is the same and like elements are indicated by like reference numerals. The set of double convex and double concave lenses 16 and 18 is designed to provide over-compensation. The opposite end of element 11 is formed with a plano-convex lens 44 in coaxial alignment with lens 16. The case 13 is modified to include a plano-concave lens 46, the concave surface of which is a portion of the spherical chamber 12 coaxially adjacent the lens 44 and in meshing engagement therewith. With such lenses 44 and 46 on the opposite side of the center of spherical element 11 from which the light rays enter, the compensation is negative. The overall compensations and dispersions of the lenses 16 and 18 and lenses 44 and 46 may be made equal respectively to 100% and zero. Negative compensation may also be provided where the planar surfaces of the lenses 44 and 46 are curved. In this regard, as the planar surfaces have their centers moved from infinity at the left (as viewed in FIGURE 3) towards the center of element 11, the compensation becomes less negtaive and equals zero for concentric surfaces about the center. For centers of curvature to the right of the center of element 11 as that which the light enters, the as the center of curvature is within the spherical element. Conversely, in the event that a set of plano-convex and plano-concave lenses is provided on the same side of the center of element 11 as that which the light enters, the compensation is positive. Positive compensation is also provided when the planar surfaces are changed to curved or spherical surfaces, provided the radii of curvature of these surfaces have centers to the right (as viewed in FIGURE 3) of the center of the spherical element 11. If the center of curvature is to the left of the center of the element and lies within the element, the compensation is positive. From the foregoing, numerous combinations of positive and negative compensating lens arrangements in addition to that depicted in FIGURE 3 will suggest themselves to those skilled in the art.

It is of importance to note that the flotation liquid 14 contained in the gyroscopic lens may be advantageously employed in a manner which contributes to the optical properties of the system. More particularly, the liquid on the optical axis may be employed to define liquid prisms capable of compensation, such as is depicted in the modified form of the lens depicted in FIGURE 4. In this regard, the transparent end of spherical element 11 opposite to lens 16 is provided with a flat circular surface 47. The clearance between these surfaces is relatively greater than between the other opposed surfaces of member 11 and wall of chamber 12. The liquid between the surfaces 47 and 48, as indicated at 49, defines a liquid prism when the case 13 is tilted relative to the gyro stabilized element 11. Upon such occurrence, the liquid 49 serves as a prism. By appropriate selection of the flotation liquid, the liquid prism may be made to have varied compensation and dispersive properties. The liquid prism formed between the flat surfaces 47 and 48 provides negative compensation. Positive compensation may be attained by liquid prisms formed between other flat or nearly flat surfaces located ahead of the back spherical edge of the element 11, i.e., between an object being viewed and the back of the element 11.

Figure 5:
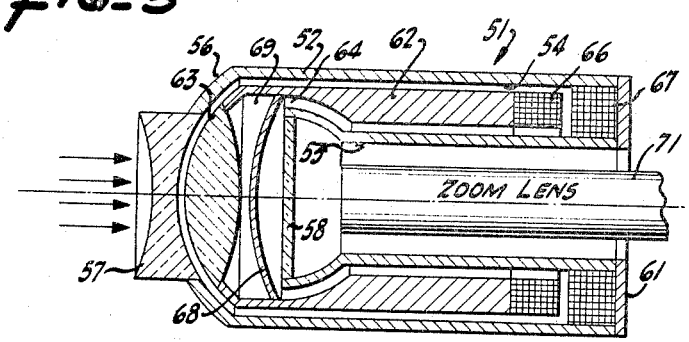
FIGURE 5 is a sectional view taken at a diametric plane through a reentrant form of the lens.

Although the various specific embodiments of the gyroscopic lens described hereinbefore have been formed of substantially spherical elements, it should be noted that this is not an absolute requirement. As stated previously, it is only necessary that all closely-mating surfaces, such as the bearings and lens surfaces have curvatures that are centered at the center of rotation. Only a small degree of angular freedom of the inner element is required, and thus nonspherical surfaces may be employed to accommodate limited movement. A reentrant form of the gyroscopic lens which will readily fit over the normal lens of a home movie camera may, for example, be provided as illustrated in FIGURE 5. The reentrant design comprises a reentrant cylindrical case 51 having coaxial outer and inner cylindrical peripheral walls 52 and 53 defining an annular space 54 therebetween. The outer peripheral wall merges with a spherical end wall 56 that is formed centrally by a lens 57. In the illustrated case, the lens 57 is double concave, the spherical interior surface of the end wall defining the interior concave surface of the lens. The inner peripheral wall 53 is closed by a transparent end wall 58 and which may be spherical or planar, as shown.

Within the annular chamber 54, there is disposed a cylindrical rotor 62 which extends forwardly of the inner wall 58 and carries a double convex lens 63 mating with the inner surface of the concave lens 57. The rotor 62 is formed with the exterior as a plurality of surfaces of revolution with the centers of same on the optical axis. A flotation liquid 64 fills the annular chamber 54 so that the rotor 62 and lens 63 thereof are separated from both inner and outer surfaces of the case by a liquid bearing. In common with above-described embodiments of the present invention, the weight of the rotor and lens substantially equals the weight of liquid displaced thereby. Additionally, the center of gravity of the rotor and lens thereof coincide with the center of buoyancy thereof, and the maximum moment of inertia about any axis through the center of the rotor exists about the optical axis of the lens 63.

Rotation of the lens 63 may be readily accomplished by the provision of pieces or slugs 66 of electrically conducting or magnetic material carried by the open end of the rotor about the circumference thereof for interaction with windings 67 disposed, for example, adjacent the end wall 61 of the case. Again in this embodiment, these windings 67 may be energized from a simple power source such as a dry cell battery through a transistorized oscillator or the like. Interiorly of the unit there may be provided a transverse wall 68 immediately behind the lens 63 and defining an air space 69 therebetween. This then provides for the establishment of a prism that may be employed to accomplish negative compensation in contrast to over-compensation provided by the combination of lenses 57 and 63, in order to achromatize the unit.

The reentrant configuration of the embodiment of FIGURE 5 will be seen to be particularly adapted for cooperation with extended lens systems, as may be employed, for example, in cameras or the like. Thus a zoom lens 71 may extend into the interior of the unit, as illustrated, in order to stabilize images entering such a lens.

Although the invention has been described hereinbefore with particular respect to several preferred embodiments thereof, it will be appreciated that numerous variations and changes may be made therein without departing from the true spirit and scope of the invention, and thus it is not intended to limit the invention except by the terms of the following claims.

What is claimed is:

1. A gyroscopic lens comprising a case, an element within said case with the exterior thereof being at least one surface of revolution, means engaging said case and element for rotating said element at a substantially constant rate about the common axis of all surfaces of revolution thereof, a flotation fluid within said case about said element and buoyantly supporting the element out of contact with said case, said case and element being transparent along the axis of rotation, and first and second lens portions disposed on the axis of rotation and separately carried by said case and element respectively, said lens portions together defining at least one pair of mating positive and negative lens elements with adjacent surfaces of each pair having common centers of curvature on said axis of rotation whereby gyroscopic action of said element stabilizes one lens portion with respect to said axis of rotation to optically compensate for accidental case movements.

2. An arrangement according to claim 1, further defined by the mass of the element being substantially equal to the mass of said fluid displaced by said element, both the center of buoyancy and the center of gravity of said element being positioned at the center of rotation thereof, and the moment of inertia of said element about its axis of rotation being greater than moments of inertia of said element about axes through the center of the element transverse to said axis of rotation.

3. An arrangement according to claim 2 wherein said fluid is a liquid, said case and element having flat spaced surfaces on said axis of rotation, and the flat spaced surfaces forming liquid therebetween into a variable liquid prism.

4. A gyroscopic lens comprising inner and outer optical elements, said outer element containing a fluid, said inner element being buoyantly supported by said fluid contained within said outer element and contacting only said fluid, said optical elements having curved mating surfaces including mating complementary spherical lens surfaces coaxially aligned with an optical axis therethrough, all of said lens surfaces being centered at the same point on said optical axis, said inner element having a mass substantially equal to the mass of said fluid thereby displaced, said inner element having a center of buoyancy positioned at the center of gravity thereof on said optical axis, said inner element having a moment of inertia about said optical axis greater than the moments of inertia thereof about axes transverse to said optical axis through the center of said inner element, and means engaging said outer element and applying a force to said inner element through said fluid for rotating at least said inner element at a substantially constant rate about said optical axis.

5. A gyroscopic lens according to claim 4, further defined by precessor means coupled between said inner and outer elements for precessing said inner element in response to and in the direction of movement of said outer element beyond a predetermined small range of angles from said optical axis.

6. A gyroscopic lens according to claim 4, wherein said means for rotating one of said elements comprising slugs of metal carried by said inner element, and stator windings carried by said outer element for energization to interact with said slugs to rotate said inner element about said optical axis.

7. A gyroscopic lens according to claim 4, wherein said means for rotating one of said elements comprises a case, bearing means mounting said outer element for rotation in said case about said optical axis, and means coupled to said outer element for rotating same.

8. A gyroscopic lens according to claim 7, wherein said means coupled to said outer element for rotating same comprises a wheel having a tractive periphery engaging the periphery of said outer element, and a motor coupled to said wheel to rotate same about an axis parallel to said optical axis.

9. A gyroscopic lens device comprising a substantially cylindrical case having a spherical chamber defined therein, said case having a lens at one end thereof with the optical axis thereof on an axis of said chamber, said lens having a concave surface defined by a portion of said spherical chamber, said case having a transparent wall at the opposite end thereof in alignment with said lens, a liquid contained within said chamber, a spherical element concentrically disposed within said chamber in said liquid and buoyantly supported thereby and contacting only said liquid, said spherical element having second lens with a convex surface in mating relationship to the concave surface of said first lens and having the same optical axis, said spherical element being transparent axially thereof through said second lens, whereby a light path is provided entirely through the device, and means engaging said case and applying a force to said spherical element through said fluid for rotating said spherical element at a substantially constant rate about said optical axis for establishing a gyroscopic action whereby said lenses optically compensate for accidental motion of the case and establish predetermined precessing motion within intentional case movement.

10. A gyroscopic lens according to claim 9, wherein the axis of maximum moment of inertia of said spherical element through the center thereof coincides with the axis of rotation thereof, said spherical element has a center of buoyancy which coincides with its center of gravity, and the mean density of said spherical element is substantially equal to the density of said liquid.

11. A gyroscopic lens according to claim 9, further defined by said case having an annular chamber coaxially about said optical axis in communication with said spherical chamber, and precessor means projecting radially outward from said spherical element and longitudinally into said annular chamber.

12. A gyroscopic lens according to claim 9, further defined by said means for rotating said spherical element comprising magnetic slugs carried in the periphery of said spherical element coaxially of said case, and stator windings carried by said case about said chamber adjacent said slugs.

13. A gyroscopic lens according to claim 9, further defined by a housing, bearing means mounting said casing within said housing for rotation about the axis of said casing, and means coupled to said casing for rotating same about its axis for thereby rotating said spherical element.

14. A gyroscopic lens according to claim 13, wherein said bearing means comprise a pair of very small bearings coaxially secured between the opposite ends of said case and said housing on the optical axis of said lenses.

15. A gyroscopic lens according to claim 9, further defined by mating third and fourth lenses respectively at the opposite ends of said spherical element and spherical chamber from said first and second lenses and in axial alignment therewith, said first and second lenses and said third and fourth lenses cooperating to produce a net predetermined compensation and zero dispersion.

16. A gyroscopic lens according to claim 9, further defined by said transparent surface portions of said spherical element and spherical chamber forming a portion of said liquid therebetween into a liquid prism, said first and second lenses and said liquid prism cooperating to produce a net predetermined compensation and zero dispersion.

17. A gyroscopic lens comprising a reentrant cylindrical case having coaxial outer and inner cylindrical peripheral walls defining an annular space therebetween, said case having a spherical end wall merging with said outer peripheral wall and a transparent end wall merging with said inner peripheral wall and coaxially spaced from said spherical end wall to define a substantially cylindrical chamber therebetween in communication with said annular chamber, said casing having an annular end wall closing said outer and inner peripheral walls at the ends thereof remote from said spherical end wall, said spherical end wall being formed centrally by a lens having an interior concave surface defining a portion of the interior surface of said cylindrical chamber, a liquid contained within said annular and cylindrical chambers, a second lens disposed within said cylindrical chamber and having a convex spherical surface in coaxial mating relation with the concave surface of said first lens, a cylindrical rotor projecting coaxially from said second lens into said annular chamber, said second lens and rotor being buoyantly supported by said liquid out of contact with said case, and means engaging said case and applying a force through said fluid for rotating said rotor at a substantially constant rate coaxially within said case.

References Cited

UNITED STATES PATENTS

| | | | |
|---|---|---|---|
| 2,921,496 | 1/1960 | Thurnheer | 350—16 X |
| 2,948,813 | 8/1960 | Osborne. | |
| 2,959,088 | 11/1960 | Rantsch | 350—16 X |
| 3,030,857 | 4/1962 | Shumway | 350—23 X |
| 3,084,443 | 4/1963 | Kaatz et al. | 350—179 |
| 3,283,408 | 11/1966 | Rothe et al. | |
| 3,378,326 | 4/1968 | Alvarez | 350—16 |

FOREIGN PATENTS

| | | |
|---|---|---|
| 1,242,003 | 6/1967 | Germany. |
| 784,693 | 10/1957 | Great Britian. |
| 790,019 | 1/1958 | Great Britian. |

DAVID SCHONBERG, Primary Examiner.

P. R. GILLIAM, Assistant Examiner.

U.S. Cl. X.R.

88—1